United States Patent [19]
Abel

[11] Patent Number: 4,758,009
[45] Date of Patent: Jul. 19, 1988

[54] TRANSPORT HAND-CART

[76] Inventor: Helmut Abel, Monte Carlo Sun, 74, Bd. d'Italie, Monte Carlo, Monaco

[21] Appl. No.: 869,756

[22] Filed: Jun. 2, 1986

[30] Foreign Application Priority Data

Jun. 4, 1985 [DE] Fed. Rep. of Germany ....... 3519960

[51] Int. Cl.$^4$ ................................................ B62B 3/02
[52] U.S. Cl. ................................... 280/39; 280/47.18; 190/18 A
[58] Field of Search .................. 280/35, 638, 639, 37, 280/38, 39, 641, 643, 646, 655, 47.18, 47.2, 47.37 R; 190/18 A

[56] References Cited

U.S. PATENT DOCUMENTS

| 1,244,506 | 10/1917 | Kirk | 280/655 |
| 2,456,932 | 12/1948 | Dostal | 280/37 |
| 3,241,852 | 3/1966 | Muller et al. | 280/47.18 |
| 4,087,102 | 5/1978 | Sprague | 280/37 |
| 4,273,222 | 6/1981 | Cassimaly et al. | 190/18 A |
| 4,362,458 | 12/1982 | Tantzi | 280/47.2 |
| 4,647,056 | 3/1987 | Baker | 190/18 A |

Primary Examiner—John J. Love
Assistant Examiner—Richard Lamby
Attorney, Agent, or Firm—Mason, Fenwick & Lawrence

[57] ABSTRACT

This transport hand-cart is used for carrying luggage or similar items and is collapsible into briefcase form. The cart has removeable wheel carriages and handle that fit into recesses in the flat load carrying portion of the cart. The wheel carriages and handle have a series of protrusions that engage slots in the load carrying portion of the cart to facilitate attachment and detachment. In the collapsed form the handle of the cart protrudes from the confines of its recess in the load carrying portion of the cart to provide a handle in the collapsed carrying position.

12 Claims, 4 Drawing Sheets

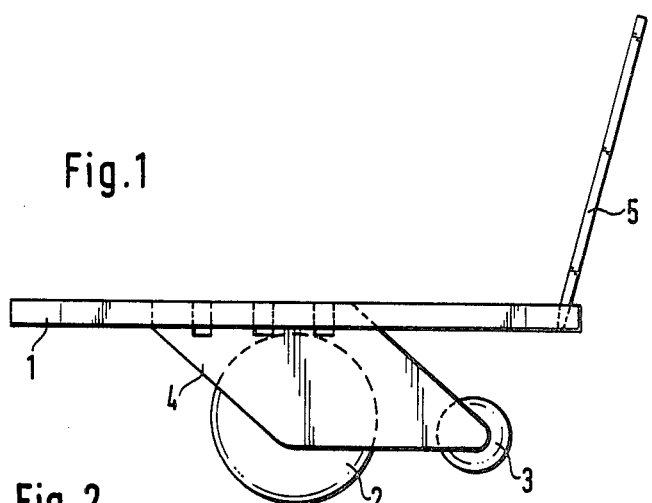
Fig. 1
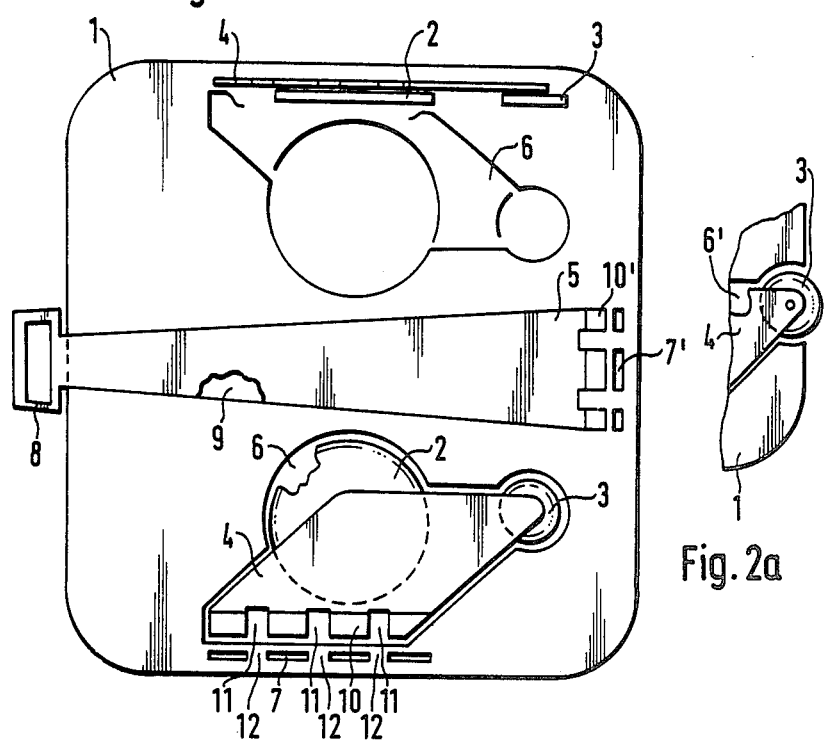
Fig. 2
Fig. 2a

TRANSPORT HAND-CART

BACKGROUND OF THE INVENTION

This invention relates to a hand-cart with parts which may be placed in use position or in stored position.

Conventional hand-carts (also sack barrows and similar carts) which can be partially folded together or collapsed, have the considerable disadvantage that their large and small wheels project in such a way that the storage or transporting of them, for example, in the trunk of an automobile, on a train or in an airplane, always presents significant problems. The reason is that in the transport mode with its obstructing, usually far-projecting wheels, it not only requires a relatively large amount of space but often also causes damage to other adjacent goods because the projecting wheels may penetrate into them. It is true that carts or other carriers with very small wheels can reduce the mentioned disadvantages, but small wheels do not represent a satisfactory solution because they cannot overcome without additional problems many obstacles, such as gutter, edges of carpets, mats, sidewalk edges, rocky ground, thresholds, soft soil, etc. Also, folding wheels, wherein the wheel-suspension element or wheel-carrying element which has hinges which makes possible a folding of the wheels through 90°, have, especially in the case of heavy loads, proven to be either unsuitable or technically and economically too costly. The reason is that, first, the natural bearing clearance in the hinges of the folding mechanism results in a "wobbling" of the wheels because these wheels have no lateral stability, and secondly, the often highly stressed wheels after their erection can be blocked in a satisfactory manner only by special, completely play-free and wear-free and therefore relatively expensive fixing or locking mechanisms. The folding mechanism as such is also technically costly and in addition requires a certain space for its housing.

A toy hand-cart is known from U.S. Pat. No. 1,244,506. In the case of this known hand-cart, the drawbar and the wheels can be removed and placed in the box-shaped transport body. Because of the depth of the box-shaped transport body and the drawbar parts and axle parts that remain attached to it, there is a considerable space requirement for the cart in its storage condition. In addition, the assembly of the different parts is difficult. During carrying of the hand-cart, the transport body must be carried with its opening upward, because otherwise the parts would fall out.

German Pat. No. 433 912 shows a hand-cart that is held together by push-in connections and which can be disassembled into its individual parts. However, in the disassembled form, it consists of a plurality of unconnected individual parts that cannot be attached to one another in a space-saving way, are relatively space-consuming and are hard to transport.

U. S. Pat. No. 4,087,102 provides a luggage cart with handles which can be pushed into a suitcase bearing frame; a mechanism is connected with the handles for swivelling the wheels into the bearing frame simultaneously with the pushing-in of the handles. The swivelling mechanism is relatively complicated, susceptible to wear and very space-consuming. In addition, the cart according to U.S. Pat. No. 4,087,102 does not permit the transport of goods that must remain horizontal.

SUMMARY OF THE INVENTION

The present invention has as an object providing a load carrying hand-cart that, with a few changes, can be collapsed in such a way that it forms only an extremely flat, easy-to-carry structure of plate-like configuration.

In the storage configuration, the cart according to the invention can be carried almost like a flat briefcase and because of its thinness and its extremely small volume, it can be conveniently stored as in the trunk of passenger cars, without any problems. It may also be hung at or placed against any wall in a space-saving manner. The thickness of the cart with the wheels, wheel-carrying elements and drawbar in stored position is only a total of about 20–30 mm. The wheels may have a fairly large diameter and may even be relatively wide and can be placed in recesses in the load supporting plate of the cart.

In the storage configuration, the cart has a flush outer surface of the different parts.

It is preferred to provide the recesses in the underside of the load support plate.

The wheels are disposed close to the wheel-carrying element and are journalled on one side of it. This permits relatively wide wheels to be housed within the load support plate without taking up space for a second wheel-carrying element and without weakening the plate by a hollow space that is too large.

In a preferred embodiment, each wheel-carrying element has a larger running wheel and a smaller supporting wheel, in which case the supporting wheel will touch the ground only when the drawbar is temporarily let go, the transport surface, in this rest position, being in a slightly inclined position.

For establishing the push-in connection between the wheel-carrying elements or plates and the drawbar, on the one hand, and the load supporting plate, on the other hand, various advantageous embodiments may also be selected which have in common that, by means of the bearing pressure of the load supporting plate or by means of the pressure of the hand pushing the hand-cart by the drawbar during usage, there results an extremely stable and highly stressable connection, the stability of which is increased by means of the bearing pressure, especially in the case of a wedge or conical shape of teeth and receiving slots.

BRIEF DESCRIPTION OF THE DRAWING

FIG. 1 is a side view of the hand-cart of the present invention;

FIG. 2 is a bottom view of the hand-cart of FIG. 1;

DESCRIPTION OF THE PREFERRED EMBODIMENTS

Figure 3:
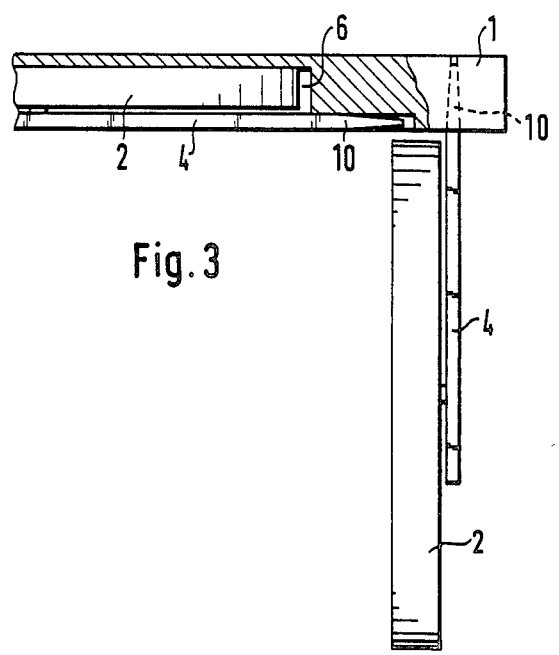
FIG. 3 is a partial cross-sectional view of parts of the hand-cart.

The planar, extremely thin, for example, only 3 mm thick, wheel-supporting plate 4—see FIG. 1 and FIG. 2 at the top—in each case carries a large running wheel 2 and at a certain distance to the rear, a smaller supporting wheel 3 which, in the horizontal position of the load supporting plate 1, i.e., during the normal travel movement, does not tough the ground. When the plate 1 that is equipped with a grooved-rubber covering is loaded, it is located in a slightly inclined position, the two supporting wheels 3 touching the ground. After the loading process, the plate 1, via the rigid drawbar 5, is brought into an approximately horizontal position and is then pushed to propel the hand-cart. The plate 1 may also in the inclined position, i.e., when the two supporting wheels 3 are touching the ground, be moved over long distances, in which case, when the direction is changed, it is first lifted slightly by means of the rigid drawbar 5—the two supporting wheels 3 will then lift off the ground—in order to then be pushed into the new direction and subsequently be pushed further again on the four wheels 2, 3.

The flat wheel supporting plate 4 with its two wheels 2 and 3 is wedge-shaped at its upper edge and is in addition equipped with several indentations or recesses 11 (FIG. 2, bottom) resulting in the formation of several spaced wedge-shaped teeth 10 (FIG. 2, bottom)—in the present case, four.

Figure 4:
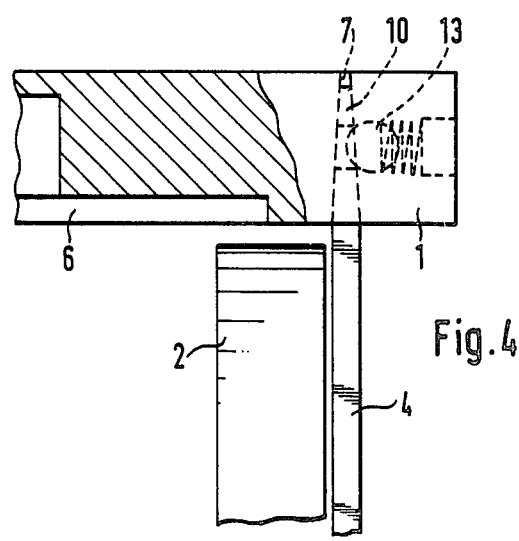
FIG. 4 is a view similar to FIG. 3 of an alternate embodiment.

The flat wheel supporting plate 4, with its wedge-shaped teeth 10 (FIG. 2), is pushed into wedge-shaped receiving openings or receiving slots 7 (FIG. 2) of the plate 1 that correspond precisely to said teeth, and are open on top or may be closed, and are held firm by one or several spring-urged balls 13 (FIG. 4). By means of this push-in fastening structure, a push-in connection is quickly made between the flat wheel supporting plate 4 and the plate 1 which connection is completely without play, is simple, not susceptible to wear and can carry particularly high loads, said connection becoming even more secure the more the plate 1 is loaded, because then the wedge-shaped teeth will be urged deeper into their corresponding wedge-shaped receiving slots.

The recesses 11 (FIG. 2) at the upper edge of the wheel supporting plate 4 make possible the formation of material bridges 12 (FIG. 2) in the material of the plate 1 and thus the formation of several receiving slots 7 (FIG. 2) that are separate from one another instead of one single continuous receiving slot. The reason is that one single continuous receiving slot at the edges of the plate 1 would have, particularly in the case of a lateral shock effect on the relatively high wheels 2, the disadvantage of expanding or even to break apart.

Figure 7:
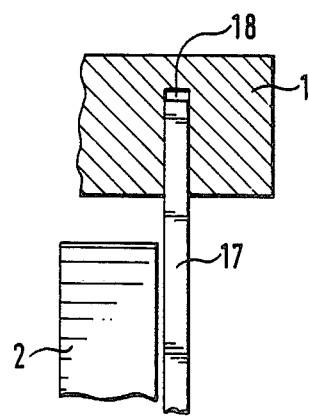

In the case of an inexpensive construction (FIG. 7) that can carry only light loads, the plate 1 may have a continuous U-shaped receiving slot 18 with parallel surfaces or such as receiving slot that is open at the top, in which case the upper edge of the flat wheel support plate 17 also has parallel surfaces.

Figure 5:
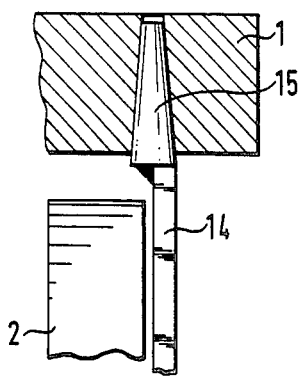
FIGS. 5, 6, 7 and 8 are views of other embodiments.
Figure 6:
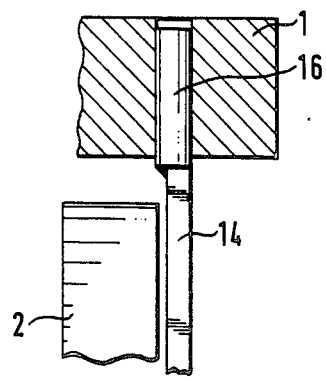

FIGS. 5 and 6 show other embodiments of the push-in connection between a wheel supporting plate 14 and the plate 1. In these embodiments, the plate 14, at its upper edge, has several conical pegs 15, FIG. 5 or cylindrical pegs 16, FIG. 6, that without play fit into corresponding conical or cylindrical receiving openings of the plate 1.

Figure 8:
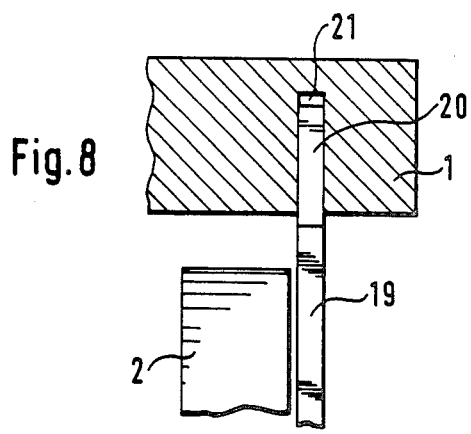
Figure 9:
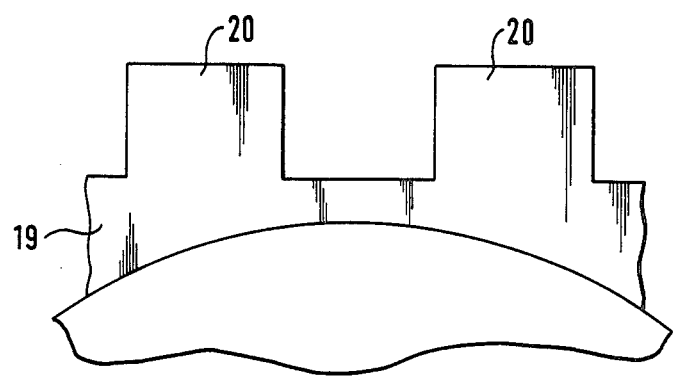
FIG. 9 is a partial lateral view of a part shown in FIG. 8.

FIGS. 8 and 9 show another embodiment of the push-in connection in which there are scalloped teeth 20 of a wheel support plate 19 and the plate 1.

The described push-in connections can also be used for wheel supporting plates that carry only one wheel or more than two wheels. They can also be used for larger and heavier transport carts that are moved by manual or machine power, and also for those having a pivotable drawbar or rotatable front or rear carts.

The push-in connection between the drawbar 5 (FIG. 2), that is shown located in its receiving recess 9, and the plate 1 also consists of wedge-shaped fastening teeth 10' and wedge-shaped receiving slots 7'. The drawbar 5 is inserted into the upper side of the plate 1. By means of the open hand grip 8 (FIG. 2), the transport plate, in the assembled condition, can be carried comfortably by hand like a flat briefcase.

FIG. 2a shows one of the wheel-carrying elements 4 placed in its receiving reces 6' which is positioned with respect to the edge of the transport plate 1 that the supporting wheel 3 projects beyond this edge. The other recess may be similarly positioned. In this way, the hand-cart in the storge condition can be vertically positioned, and guided by the grip 8 of the drawbar 5, and can be moved on both supporting wheels 3, i.e. the hand-cart may be rolled and not be carried by hand. The recesses 6, 9 are not necessarily located in the bottom side of the plate 1, but they may instead be located in the top side. They are of sufficient depth that the wheel carrying element 4 and drawbar 5 are flush with the bottom surface of plate 1.

From the storage configuration shown in FIG. 2, the operable position according to FIG. 1 can be achieved with a few movements of the hand, in particular the wheel supporting plate 4 can be taken out of the recesses 6 and the teeth 10 can be pushed from below into the receiving slots 7 on both sides of the plate 1. Subsequently, the drawbar 5 is taken out of the recess 10 and the teeth 10' are inserted from above into the receiving slots 7' of the plate 1. By means of these few movements of the hand, the hand-cart becomes fully operable. After the end of the transport of goods, the parts in reverse sequence can be placed in the recesses 6, 9 again and the extremely space-saving flat arrangement according to FIG. 2 is restored.

I claim:

1. A hand cart comprising:
   a plate for supporting a load,
   means for supporting said plate in a substantially horizontal position comprising a pair of laterally spaced wheel supporting plates each having at least one wheel journalled to it, each said wheel supporting plate and wheel having a thickness not substantially greater than the thickness of said load supporting plate,
   means for detachably securing said load plate supporting means to said load supporting plate comprising two series of slots in said load supporting plate and a series of teeth on each of said wheel supporting plates for entry into a said series of slots,
   a drawbar for propelling said load supporting plate, said drawbar being of thickness not substantially greater than said load supporting plate,
   means for detachably securing said drawbar to said load supporting plate, and
   recess means in said load supporting plate for receiving said load plate supporting means and said drawbar substantially within the boundaries of the largest surfaces of said load supporting plate.

2. A hand cart as set forth in claim 1, wherein said means for supporting said plate, when in said recess means lie entirely within the periphery of said load supporting plate.

3. A hand cart as set forth in claim 1, wherein when said plate supporting means are in said recess means, a portion of at least one said wheel extends beyond the periphery of said load supporting plate.

4. A hand cart as set forth in claim 3, wherein said drawbar has a hand grip at one end, and wherein said hand grip extends beyond the periphery of said load supporting plate when said drawbar is in said recess means.

5. A hand cart as set forth in claim 4, wherein said portion of said wheel and said grip of said drawbar extend beyond opposite edges of said load supporting plate.

6. A hand cart as set forth in claim 1, wherein said load plate supporting means and said drawbar, when in said recess means, do not extend beyond the thickness of said load supporting plate.

7. A hand cart as set forth in claim 1, wherein said recess means extend into said load supporting plate oppositely from the surface thereof which supports loads when said load supporting plate is in load transporting position.

8. A hand cart as set forth in claim 1, wherein each said wheel is journalled to and lies beside a said load plate supporting plate.

9. A hand cart as set forth in claim 1, wherein a pair of wheels is journalled to each said load plate supporting plate with their axes spaced, one said wheel being of larger diameter than the other said wheel, the smaller diameter wheel being spaced from the ground when said load supporting plate is substantially horizontal and said larger diameter wheel is on the ground.

10. A hand cart as set forth in claim 1, wherein said teeth and said slots are of mating, tapering shape.

11. A hand cart as set forth in claim 1, and further comprising spring actuated holding means for latching at least one said tooth in a said opening.

12. A hand cart as set forth in claim 1, said recess means having substantially the same size and shape as said means for supporting said load supporting plate and at least a portion of said drawbar.

* * * * *